March 2, 1954 F. W. WALDRON 2,670,571
FLOWER GROWING CONTAINER
Filed Oct. 26, 1949
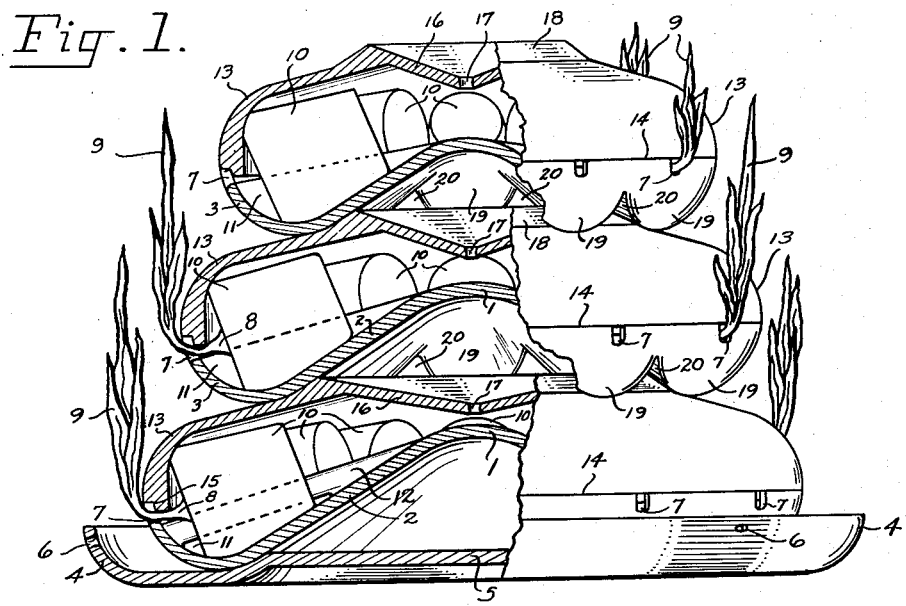
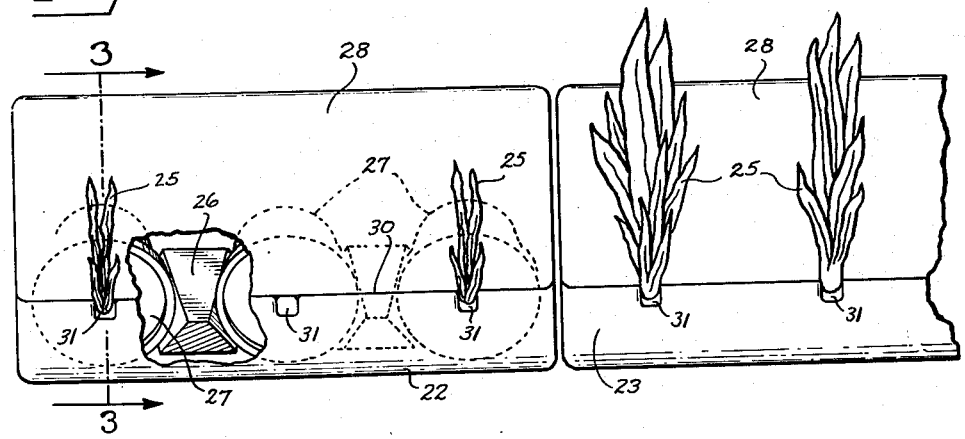
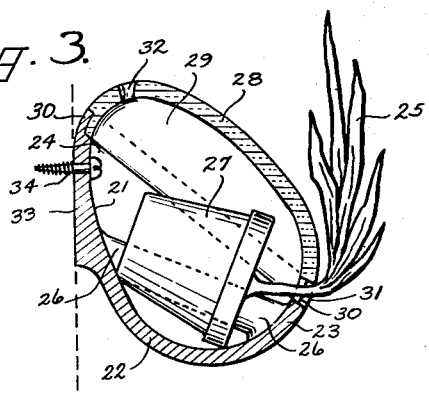
INVENTOR.
Francis W. Waldron
BY
His Agent Patented Mar. 2, 1954

2,670,571

UNITED STATES PATENT OFFICE 2,670,571

FLOWER GROWING CONTAINER

Francis W. Waldron, Portland, Oreg.

Application October 26, 1949, Serial No. 123,759

9 Claims. (Cl. 47—34)

1

This invention pertains to flower boxes, and relates particularly to the novel construction of a flower box and to the method of growing plants whereby the latter are caused to curve upwardly in pleasing and graceful fashion from adjacent the bottom of said box.

A principal object of the present invention is to provide a flower box in which plants are arranged initially to project outwardly and downwardly therefrom, whereby said plants are caused to curve upwardly toward the sun during subsequent growth.

Another important object of this invention is the provision of a flower box which accommodates initial downward or lateral growth of plants deposited therein and which affords efficient aeration and feeding of said plants.

A further object of this invention is to provide a flower box constructed in such manner as to permit their assembly in vertically stacked units for aristic display and to accommodate the tending of each box in the array without preliminary disassembly.

A still further object is the provision of a flower box which accommodates entire assemblies of potted plants, thereby obviating the necessity of removing the conventional pot before arranging the plants for display.

A further object of the present invention is the provision of a flower box constructed in such manner as to insure the separation of plants arranged therein.

A further important object of this invention is to provide a method of growing plants whereby the latter are caused to project outwardly adjacent the bottom of their container and thence to curve upwardly in artistic display.

These and other objects and advantages of the present invention will appear from the following detailed description taken in connection with the accompanying drawing, in which:

Figure 1 is a front elevation of a flower box assembly embodying the features of the present invention, parts thereof being broken away to show details of construction and to illustrate the manner in which plants are arranged therein;

Figure 2 is a fragmentary front elevation of a pair of flower boxes illustrating a modified construction, a part thereof being broken away to show details of spacer means by which potted plants may be confined in spaced relation one with another; and Figure 3 is a transverse sectional view taken along the line 3—3 in Figure 2.

Stated broadly, the flower box of the present invention comprises a base section in which the

2 plants are deposited for growth and display, and a removable cover section which overlies and encloses the base section. Apertures are formed along the junction of said sections for passage of the stems of the plants to be displayed. In the preferred form of the present invention, said apertures, and therefore the junction of the base and cover sections, are disposed slightly above the lowermost portion of the base section, for purposes explained in detail hereinafter. Plants deposited in a flower box constructed in accordance with the disclosure of the present invention are caused to extend initially in a downward or lateral direction relative to said box and thence to curve upwardly toward the sun as growth continues.

Referring to Figure 1 of the drawing, three circular flower boxes are shown in vertically stacked arrangement. The diameters of said boxes preferably decrease upwardly to form a pyramidal or conical unit of pleasing design. The vertical depth of said boxes may also be varied, proportionately with the diameter, if desired. Except for said differences in dimensions, the upper two flower boxes are identical in construction. The base section of the lowermost flower box is of slightly altered form, as shown, although it may be constructed in the manner of the upper boxes if preferred.

In the lowermost flower box of the unit illustrated in Figure 1, the inner portion of the circular base section is formed in the shape of a cone with the apex 1 forming the vertical center of the flower box. The inner conical wall 2 of said base section diverges downwardly from the apex and is then turned upwardly and outwardly to form a smoothly curved outer wall 3. An upturned rim 4 extending outwardly about the base section may be provided for purposes of collecting the overflow of water which may escape from the box as a result of inadvertent excessive watering, as expained hereinafter. The rim 4 may be formed as an integral part of the base section. Alternatively, the rim may be provided in the form of a separate tray 5 upon which the base section may be removably centered, as shown in Figure 1 of the drawing. Holes 6 are provided at spaced intervals adjacent the upper edge of the rim 4 for purposes of attaching chains or other means (not shown) by which the flower pot array may be suspended in the manner of a chandelier. The rim 4 thus serves not only as means for collecting the excess water but also as bracket means by which the flower box may be suspended for display. In the event that the water collecting rim is not desired, bracket arms formed, for example, in the shape of segments of the rim 4, may be secured at spaced intervals about the base section. Each bracket may be provided with a hole 6 or other conventional means for securing the chain or other suspending device, as explained hereinbefore.

Formed at intervals circumferentially about the edge of the outer wall 3 are a plurality of slots 7 each of which functions to provide passage for the stem 8 of a plant 9. The plant is preferably first started to grow in the usual type of flower pot until its stem projects above the soil. The plant, together with its surrounding soil 10, may then be removed from the pot and deposited in the base section of the flower box, as shown in Figure 1, with the stem projecting outwardly through the slot 7. Alternatively, the plant and its surrounding soil may be left in the original flower pot and the entire assembly arranged in the box, as illustrated in Figures 2 and 3 of the drawing.

The circumferential cavity formed between the outer wall 3 and the inner wall 2 forms a water well 11 below the level of the apertures 7. The lowermost portion of the soil 10 is disposed within said well whereby moisture is drawn upwardly therethrough to feed the growing plant. In order to prevent radial or circumferential displacement of the soil 10, upstanding ribs 12 may be positioned at opposite sides of the former. Said ribs preferably extend from the outer wall 3 toward the apex 1 of the inner wall 2, with an opening provided between the under side of the ribs and the lowermost portion of the water well 11. In this manner, water may flow circumferentially about the well to feed each of the plants arranged in the flower box. The ribs are preferably formed as an integral part of the base section, although they may be mounted detachably therein if preferred.

The cover section 13 of the flower box illustrated in Figure 1 of the drawing comprises a circular member which converges upwardly from its base-engaging rim 14. Said rim is formed with an offset step 15 proportioned and arranged to engage the edge of the outer wall 3 of the base section. The upper central portion of the cover 13 is depressed, forming a conical receiver 16 with its apex coinciding with the apex 1 of the base section. A hole 17 is provided in the apex of said receiver for purposes of admitting water to the plants, as described in detail hereinafter. The depressed receiver 16 and hole 17 may be omitted if it is preferred to water the plants directly by removing the cover. A raised shoulder 18 is formed circumferentially at the upper edge of the depressed receiver 16 and functions to maintain the next higher flower box centered thereon.

As stated hereinbefore, the upper two flower boxes differ from the lowermost box only in the construction details of the base sections. The base section of each of the upper boxes is impressed upwardly at spaced intervals about its periphery to form scallops or individual pockets 19. Each of these pockets serves to contain a potted plant, while the raised ridges formed between adjacent pockets prevent circumferential displacement of said plants. The slots 7 are disposed centrally with respect to the curvature of each pocket.

In addition to providing the pockets 19, said scalloped impressions form openings 20 which communicate with the depressed receiver 16. Said openings are conveniently utilized to introduce water into the receiver for purposes of feeding the plants, thereby obviating the necessity of removing the next higher flower box when watering the plants in the box disposed therebelow. A further advantage of said openings resides in the provision of an open air passage from the slots 7 through the interior of the flower box and outwardly through the openings 17 and 20 for aerating the soil 10. As stated hereinbefore, the base section of the lowermost flower box may be scalloped in the manner of the upper boxes, if desired.

Although the flower boxes illustrated in Figure 1 of the drawing are of circular design, it will be apparent to those skilled in the art that said boxes may be constructed of oval, rectangular or any other shape desired without departing from the spirit of the present invention. In all cases, however, the base section will have an elevated apex and therefore the term conical as used in the appended claims is intended to include any suitable conical or pyramidal shape selected.

In preparing an array of plants in the boxes shown in Figure 1, the cover section 13 is first removed to expose the interior of the base section. Plants selected to be displayed are then deposited with their soil and, if desired, their enclosing pots, in said base section. In the event that the plants to be displayed have been removed from their parent soil, they may be replanted in soil deposited in the base section. Alternatively, the soil may be molded about each plant prior to arrangement in the flower box. In any case the stem of each plant is arranged to extend outwardly and preferably downwardly through a slot 7. Moisture may be added as required.

Packing material, such as peat moss or other suitable bulky substance, may be deposited about each plot of soil to prevent excessive dehydration. Such packing is particularly desirable in cases where the ribs 12 or pockets 19 are not provided, in order to prevent circumferential displacement of the soil. The cover 13 is then arranged over the base section with the stepped edge 15 engaging the rim of the outer wall 3 of the base section. After completing the assembly of the three or other desired number of boxes, they may be arranged as shown in Figure 1. The array may be displayed upon a table or suspended as a chandelier, as previously explained. Subsequent watering may be accomplished by extending a watering tube or the long spout of a watering can through the openings 20. Water which passes through the port 17 at the apex of the receiver 16 flows evenly in all directions down the wall 2 of the base section and thence into the water well 11.

The flower box illustrated in Figures 2 and 3 differs in details of construction from the structure described hereinbefore, but the functions of both types are substantially the same. The flower box includes an elongated base section which forms the back 21, bottom 22, partial front 23 and partial ends 24 of the box. As best shown in the cross sectional view of Figure 3, the back and partial front of the base section curve upwardly from opposite sides of the bottom 22 whereby the latter may be utilized as a water well for feeding the plants 25 deposited in the box. Ribs 26 may be provided at spaced intervals along the length of the base section to prevent lateral displacement of the plots of soil or flower pots 27 containing the soil in which the roots of the plants are embedded. Said ribs 26 may be formed in the same manner as the ribs 12 of the lowermost box of the structure illustrated in Figure 1. Alternatively, the base section may be scalloped along its length in the manner of the upper two boxes shown in Figure 1, to provide pockets in which the individual plants may be contained.

The flower box also includes a cover 28 which overlies and encloses the base section. The partial end walls 29 cooperate with the end walls 24 of the base section to complete the box enclosure. The abutting longitudinal edges of the base and cover sections are offset to form lap joints 30 by which positive engagement of said sections is insured. Corresponding portions of the base and cover sections along the lap joint disposed at the front of the flower box are cut away at intervals along the length of said joint to form spaced openings 31 therethrough. Said openings communicate with the interior of the box and define the upper limit of the water well formed by the bottom 22 of the base section. Each opening accommodates the stem of a plant 25 which is deposited for growth within the flower box, in manner similar to that of the structure illustrated in Figure 1 of the drawing. Holes 32 or a longitudinal slot may be provided in the cover 28 for purposes of introducing water into the water well without necessitating removal of the cover. As shown in Figure 3, the holes 32 are preferably formed near the rear of the box in order that water admitted therethrough will flow downwardly along the back 21 rather than fall directly upon the plant.

The flower box illustrated in Figures 2 and 3 of the drawing is particularly suitable for attachment to vertical supports each, for example, as a window casing, wall, or supporting post. For such installations the outer surface of the back portion 21 of the base section is provided with a plane bracket section 33 proportioned and arranged to abut against the surface upon which the box is to be supported. The box may be secured to said support by any of the conventional means well-known in the art, such as by the screws 34 shown in Figure 3. If it is desired that the flower box be supported upon a table or other horizontal member, the bracket 33 may be extended downwardly and rearwardly to form a brace against which the box may stand in upright position.

The procedure for preparing an array of plants within the flower box illustrated in Figures 2 and 3 is substantially the same as the method described hereinbefore with reference to the structure shown in Figure 1. The soil may be removed from the flower pot 27 in which the plant was started, or the pot may be retained, as desired. In the event that the ribs 26 are not provided, the potted plants may be packed with peat moss or other suitable bulk material to prevent lateral displacement, as explained hereinbefore.

Although the flower box shown in Figures 2 and 3 is oval in cross sectional outline, it is apparent that any suitable shape may be selected without departing from the scope and spirit of the present invention. It is necessary only that the forward lapping edges 30 extend above the bottom 22 sufficiently to provide the feed well described hereinbefore. The flower box may be curved throughout its length, if desired, or it may be constructed as a closed loop of circular, oval, or polygonal design. The closed loop construction is particularly adaptable for mounting about vertical supports of large dimension, such as structural pillars.

It is to be mentioned here that many plants will grow in the absence of soil by artificial feeding through the medium of chemically treated water. The flower boxes of the present invention are adapted for use with such preparations. The roots of plants to be displayed in this manner are removed from their parent soil or other medium and deposited in the treated water contained in the water well 11 or 22, with the stems thereof extending outwardly through the apertures 7 or 31. The space above the roots is then packed with peat moss or other bulk material in order to prevent displacement of the roots from the water or from their selected position within the box.

In the event that the roots of the plants do not extend into the water well, the feeding solution is drawn upwardly through the packing material and thereby made available to the plants. In this respect the bulk material functions in the manner of soil, and therefore the term bulk material employed in the appended claims is intended to include soil, peat moss and any other matter which may be suitable for covering the plant roots to prevent their displacement and to convey the feed solution from the well to said roots.

The flower boxes of the present invention may be constructed of wood, ceramic, glass, metal, or synthetic plastic materials in accordance with conventional practices well-known in the art. Various modifications may be made in the structural details of the flower boxes already described without departing from the scope and spirit of the invention. For example, the ribs 12 or 26 may be secured to the cover section 13, 28, respectively, rather than being mounted or removably arranged in the base section of the box. Said ribs may, for example, depend from the cover section sufficiently to rest upon the base section transversely of the feed well. The height of the ribs may be chosen to elevate the cover in such manner as to provide a circumferential slot between the complementary edges of the base and cover sections. By engaging the inner walls of the base section the ribs function to maintain the cover centered above the base section in addition to separating the plants arranged within the box.

Having thus described my invention and the manner in which the same may be used, what I claim as new and desire to secure by Letters Patent is:

1. A planting box comprising a base section having interconnecting upwardly extending outer and inner wall portions forming a feed well therebetween, the inner wall extending above the edge of the outer wall, and a removable cover section proportioned and arranged to overlie said base section, the outer edges of said base and cover sections being complementary for mutual engagement, said box being apertured along the complementary edges of said base and cover sections for the passage of a plant stem therethrough, said box accommodating the initial arrangement of plant stems laterally outward therefrom causing said plants to curve upwardly adjacent the outer surface of the box during subsequent growth.

2. A planting box comprising a conical base section having an upturned outer wall, the conical section forming an upwardly extending inner wall and defining with the outer wall a feed well therebetween, the inner wall extending above the edge of the outer wall, and a removable cover section proportioned and arranged to overlie said base section, the edges of said base and cover sections being complementary, said box being apertured along the complementary edges of said base and cover sections for the passage of a plant stem therethrough.

3. A planting box comprising a conical base section having an upturned outer wall, the conical section forming an upwardly extending inner wall and defining with the outer wall a feed well therebetween, the inner wall extending above the edge of the outer wall, a removable cover section proportioned and arranged to overlie said base section, the edges of said base and cover sections being complementary, said box being apertured along the complementary edges of said base and cover sections for the passage of a plant stem therethrough, said cover section having a central apertured cavity therein for introducing feed material into said well, and a circumferential shoulder adjacent the central cavity of said cover section proportioned and arranged to maintain a second base section centered thereon permitting vertical stacking of a plurality of said boxes.

4. A planting box assembly formed of a plurality of containers each comprising a conical base section having an upturned outer wall, the conical section forming an upwardly extending inner wall and defining with the outer wall a feed well therebetween, the inner wall extending above the edge of the outer wall, a removable cover section proportioned and arranged to overlie said base section, the edges of said base and cover sections being complementary, said container being apertured along the complementary edges of said base and cover sections, said cover section having an aperture therein for introducing feed material into said well, and shoulder means on said cover section proportioned and arranged to maintain a second base section centered thereon permitting vertical stacking of a plurality of said containers.

5. A planting box comprising an elongated base section having end walls and interconnecting upwardly extending outer and inner wall portions forming a feed well therebetween, the inner wall extending above the edge of the outer wall, and a removable cover section proportioned and arranged to overlie the base section, the edges of said base and cover sections being complementary, said box being apertured along the complementary edges for passage of a plant stem therethrough.

6. The planting box of claim 1 including spacer means extending transversely of the feed well for maintaining spaced relation between plants.

7. The planting box of claim 2 wherein the cover section is formed with a central apertured cavity for introducing feed material into the well.

8. The planting box of claim 2 including shoulder means on the cover section proportioned and arranged to maintain a second base section centered thereon permitting vertical stacking of a plurality of said planting boxes.

9. The planting box of claim 2 wherein the base section is scalloped to form spacer means extending transversely of the feed well for maintaining spaced relation between plants.

FRANCIS W. WALDRON.

References Cited in the file of this patent

UNITED STATES PATENTS

| Number | Name | Date |
| --- | --- | --- |
| 96,144 | Putnam | Oct. 26, 1869 |
| 147,849 | Leslie | Feb. 24, 1874 |
| 814,595 | Eggleton | Mar. 6, 1906 |
| 1,503,931 | Wightman | Aug. 5, 1924 |
| 1,989,493 | Dauernheim | Jan. 29, 1935 |
| 2,514,536 | Burney | July 11, 1950 |

FOREIGN PATENTS

| Number | Country | Date |
| --- | --- | --- |
| 4,781 | Great Britain | 1905 |
| 90,370 | Sweden | July 29, 1937 |
| 100,911 | Germany | Jan. 18, 1899 |